UNITED STATES PATENT OFFICE.

JAMES H. REEVE, OF OSWEGO, NEW YORK, ASSIGNOR TO THE DIAMOND MATCH COMPANY, OF CHICAGO, ILLINOIS, A CORPORATION OF ILLINOIS.

PROCESS OF TREATING SALINE LIQUORS.

1,305,566.  Specification of Letters Patent.  Patented June 3, 1919.

No Drawing.  Application filed December 6, 1915. Serial No. 65,171.

*To all whom it may concern:*

Be it known that I, JAMES H. REEVE, a citizen of the United States, and resident of the city and county of Oswego and State of New York, have invented certain new and useful Improvements in Processes of Treating Saline Liquors, of which the following is a specification.

This invention relates to a process of treating natural and artificial saline liquors for the purpose of obtaining potassium chlorid and other compounds therefrom; having particular reference to the treatment of the water of Great Salt Lake, a typical analysis of which follows:—

| | |
|---|---|
| Water | 80.34 |
| Cl | 11.26 |
| $SO_4$ | 1.33 |
| Na | 6.10 |
| K | .37 |
| Ca | .08 |
| Mg | .52 |
| Total | 100.00 |

In carrying out my invention in a simple and efficient manner the lake water is pumped into large ponds and therein evaporated by solar heat (or is pumped into suitable containers and therein evaporated by artificial heat) until a predetermined point of concentration has been attained, preferably one wherein the potassium chlorid content is approximately 5%. At this stage the gravity of the solution is approximately 34° B. and a large portion of its sodium chlorid has been precipitated. The concentrated liquor, containing substantially all the potassium and magnesium salts mixed with sodium chlorid and sulfate, is then pumped into suitable containers and sufficient magnesium chlorid is added to the liquor to hold the potassium chlorid in hot solution while the other constituent salts are being precipitated. The magnesium chlorid can be added as an aqueous solution if desired. If desired, the magnesium chlorid may be added to the water previous to the step of concentration.

The magnesium chlorid added to the liquor is in amount sufficient to bring the ratio of $MgCl_2$ to KCl in the liquor up to more than 3:1 and preferably sufficient to bring this ratio up to about 9:1 or 10:1. (This is of course in addition to whatever amount of magnesium chlorid is necessary for reacting with sulfate present to form $MgSo_4$.) The mixed liquor is then brought to a gravity of about 36°–37° B. hot, either by the addition or by the evaporation of water, and the solution is maintained at or about that gravity, just below its boiling point, for a period of several hours. During such period practically all of the sulfate content of the liquor crystallizes out as a partially anhydrous salt, viz., magnesium sulfate mixed with more or less sodium chlorid, and the liquor while hot is separated from the deposited crystals of magnesium sulfate and sodium chlorid.

The mother liquor on cooling deposits the double magnesium and potassium chlorid, as artificial carnallite. While this liquor before cooling may still contain some sodium chlorid in solution, this sodium chlorid will not separate out during the cooling, since there is not the same tendency to form a double compound thereof with the magnesium chlorid, as there is in the case of potassium chlorid. Sodium chlorid is also approximately as soluble cold as hot. Hence substantially no sodium salts separate with the carnallite. The crystallized carnallite is removed and dissolved in boiling water, and the hot solution is allowed to cool, the greater part of the potassium chlorid thus crystallizing out. The resultant salt, which is then removed, contains 80% to 90% potassium chlorid, unwashed, that is to say, commercially pure muriate of potash.

The mother liquor from the carnallite yield is concentrated by hot evaporation to a gravity of 40° B., and it is then decanted from the precipitated crystals, (sodium-chlorid, etc.) The liquor is decanted and on cooling deposits magnesium chlorid which is thus recovered and used over in succeeding operations.

It is to be understood, of course, that this same mother liquor from the carnallite yield may be filtered to remove dirt and separated inorganic matter, and then used over in succeeding operations in the form of a solution.

The mother liquor from the potassium chlorid crystallization on further evaporation deposits the remaining potassium chlorid, combined with magnesium chlorid as artificial carnallite which is treated the same as above described for the crystallization of the potassium chlorid, and the final mother liquor consists essentially of a solution of magnesium chlorid.

The preferred process above described may be varied to meet specific requirements without departing from the principle of my invention.

What I claim is—

1. A process of treating saline liquor of the character described, which comprises separating a portion of the sodium chlorid from the liquor; adding to the mother liquor a sufficient quantity of magnesium chlorid to hold the potassium chlorid in hot solution while the other constituent salts of the liquor are being precipitated; removing the hot liquor; cooling it to obtain artificial carnallite, and separating the potassium chlorid constituent from the carnallite.

2. A process of treating saline liquor of the character described, which consists in separating a portion of the sodium chlorid from the liquor; adding to the mother liquor a sufficient quantity of magnesium chlorid to hold the potassium chlorid in hot solution; keeping the solution at a gravity of about 36° B., hot, for a sufficient period for the precipitation of magnesium sulfate as a partially anhydrous salt; separating the hot liquor from the precipitated crystals; cooling the liquor to obtain artificial carnallite, and separating the potassium chlorid constituent from the carnallite.

3. A process of treating saline liquor of the character described, which comprises adding to the liquor a sufficient quantity of magnesium chlorid to hold the potassium chlorid content of the liquor in hot solution while the other saline constituents of the liquor are being precipitated; removing the hot liquor from the precipitated salts, and cooling the liquor to obtain therefrom a deposit of artificial carnallite.

4. A process of treating saline liquor of the character described, which comprises adding to the liquor a sufficient quantity of magnesium chlorid to hold the potassium chlorid content of the liquor in hot solution while the other saline constituents of the liquor are being precipitated; removing the hot liquor from the precipitated salts; cooling the liquor to obtain therefrom a deposit of artificial carnallite, and separating the potassium chlorid constituent from the carnallite.

5. A process of treating saline liquor of the character described, which comprises adding to the liquor a sufficient quantity of magnesium chlorid to hold the potassium chlorid content of the liquor in hot solution while the other saline constituents of the liquor are being precipitated; removing the hot liquor from the precipitated salts; cooling the liquor sufficiently to obtain therefrom a deposit of artificial carnallite; separating the potassium chlorid constituent from the carnallite; concentrating by hot evaporation the mother liquor from the carnallite; cooling said liquor for the deposit of magnesium chlorid, and adding such deposit to a succeeding batch of material.

6. A process of treating saline liquor of the character described, which comprises adding to the liquor magnesium chlorid, and keeping the solution at a gravity of about 36° B., hot, for a sufficient period for the precipitation of magnesium sulfate as a partially anhydrous salt.

7. A process of obtaining potassium chlorid from saline waters containing the same, which comprises producing hot solutions containing not materially less than nine parts of $MgCl_2$ to each part of $KCl$, and containing also sodium compounds and sulfates, maintaining such liquor at near its boiling point and at a gravity of not less than about 36 to 37° B. (measured hot), until a material proportion of the sulfate content is converted into solid magnesium sulfate, and until a material proportion of the sodium present is converted into solid sodium chlorid, and then separating the liquor form the separated solids.

8. In the treatment of natural brines, freeing the same from the bulk of the sodium and sulfate radical, then cooling the residual liquor while containing several times as much $MgCl_2$ as $KCl$, under conditions to produce the crystallization of carnallite, redissolving the latter in boiling water, and cooling the same to produce $KCl$, leaving $MgCl_2$ in solution.

9. A process of treating saline water containing chlorids and sulfates of sodium, potassium and magnesium, which comprises evaporating the same to a content of about 5% $KCl$ and adding $MgCl_2$ in quantity to bring the ratio of $MgCl_2$ to $KCl$ up to within the approximate range of 9:1 to 10:1, and thereafter holding the resulting liquor at near its boiling point and at the approximate gravity of 36 to 37° B., until the major portion of the sodium and sulfate radical separate from the liquor, drawing off the hot liquor and cooling the same sufficiently to produce the separation of a double chlorid of potassium and magnesium.

10. A process of treating saline water containing chlorids and sulfates of sodium, potassium and magnesium, which comprises evaporating the same to a content of about 5% $KCl$ and adding $MgCl_2$ in quantity to bring the ratio of $MgCl_2$ to $KCl$ up to within the approximate range of 9:1 to 10:1, and thereafter holding the resulting liquor at near its boiling point and at the approximate gravity of 36 to 37° B., until the major portion of the sodium and sulfate radical separate from the liquor, drawing off the hot liquor and cooling the same sufficiently to produce the separation of a double chlorid of potassium and magnesium and subsequently decomposing said double chlorid to isolate its content of KCl.

11. In the recovery of salts from saline waters, containing chlorids and sulfates, the step of maintaining such a water, while containing magnesium in material excess over the quantity of sulfate radical, at near the boiling point while at a concentration of not less than about 36° B., until the bulk of the sulfate radical becomes combined with magnesium as a compound insoluble in the liquor.

12. In the treatment of saline waters containing sodium and potassium in the form of chlorids and sulfates, the step of producing a liquor, containing such salts and containing magnesium compounds in material excess over that amount which would correspond to the amount of magnesium necessary to form magnesium sulfate with all the sulfate radical present, and an amount of magnesium chlorid, double the amount of potassium chlorid present; maintaining such liquor at a temperature near its boiling point until substantially all the sulfate radical is converted into a magnesium sulfate insoluble in the hot liquor, drawing off the hot liquor from the separated salts, and cooling the same sufficiently to produce artificial carnallite.

13. A process of treating saline liquor of the character described, which comprises adding to the liquor a sufficient quantity of magnesium chlorid to hold the potassium chlorid content of the liquor in hot solution while the other saline constituents of the liquor are being precipitated; removing the hot liquor from the precipitated salts; cooling the liquor to obtain therefrom a deposit of artificial carnallite, separating the potassium chlorid constituent from the carnallite and adding the magnesium chlorid constituent of the carnallite to a succeeding batch of liquor.

Signed at New York, in the county and State of New York, this 4th day of December, 1915.

JAMES H. REEVE.